United States Patent [19]
Patti

[11] Patent Number: 5,827,026
[45] Date of Patent: Oct. 27, 1998

[54] ATTACHMENT DEVICE

[76] Inventor: Tony J. Patti, 13920 Mt. McClellan Blvd. #B, Reno, Nev. 89506

[21] Appl. No.: 884,185

[22] Filed: Jun. 27, 1997

[51] Int. Cl.[6] .............................. F16B 37/02; F16B 37/04
[52] U.S. Cl. ............................ 411/174; 411/112; 411/999
[58] Field of Search ................................. 411/104, 111, 411/112, 113, 174, 175, 999, 526, 527

[56] References Cited

U.S. PATENT DOCUMENTS

| | | | |
|---|---|---|---|
| 2,378,684 | 6/1945 | Carlstrom | 411/527 X |
| 4,375,933 | 3/1983 | Hassler et al. | 411/174 X |
| 4,728,235 | 3/1988 | Patti | |
| 5,538,377 | 7/1996 | Stewart et al. | 411/174 |

Primary Examiner—Neill Wilson
Attorney, Agent, or Firm—Ian F. Burns

[57] ABSTRACT

An attachment device for attaching one object to another object. The attachment device comprises a U-shaped clamp, a bolt, and a U-shaped nut. The clamp has an upper and low portion and the nut has two upward projecting members. The upper and lower portions have a hole for receiving the bolt and the lower portion has two nut holes for receiving the upward projecting members of the nut. A first object is inserted between the upper and lower portions and the bolt is tightened to cause the upper and lower portions to grasp the first object. The upward projecting members prevent the attachment device from being over tightened and weakening the clamp. The members also prevent the attachment device from rotating when it is clamped to the first object. A second object may be attached to the attachment device by inserting the bolt through a hole in the second object.

14 Claims, 1 Drawing Sheet

ATTACHMENT DEVICE

BACKGROUND OF THE INVENTION

1. Field of Invention

This invention relates to a device for attaching objects together. The invention is particularly well adapted to objects with smooth surfaces.

2. Description of Related Art

Many different attachment devices have been developed for attaching one object to another object. An example of a superior attachment device is found in U.S. Pat. No. 4,728,235 issued to Patti. This invention comprises a C-shaped clamp with holes for receiving a bolt. A standard nut is provided for receiving the bolt on the opposite side of the clamp so that the bolt may create a compressing force on the clamp. One of the advantages of this device is that tabs are provided on one of the legs of the clamp for preventing the device from being over tightened. As the bolt of the device is tightened, the tabs abut the opposing leg and prevent the device from being deformed or crushed. The tabs also form a stop upon which an object may rest to prevent the device from rotating when it is attached to the object.

However, it has been found that additional advantages can be obtained if a U-shaped nut is used in place of the standard nut. The upper members of the U-shaped nut can project upwards and perform the same function as the tabs. This allows the tabs to be eliminated from the design, which makes the device less expensive to manufacture. A U-shaped nut can also perform other functions, such as absorbing vibrations.

SUMMARY OF INVENTION

1. Objects of the Invention

It is a primary objective of the present invention to provide an attachment device for attaching one object to another object.

It is an another object of the present invention to provide an attachment device that does not require the use of holes in an object that is being grasped.

It is another object of the present invention to provide an attachment device that is temporary and does not damage an object that is being grasped.

It is a further object of the present invention to provide an attachment device that comprises means for preventing the attachment device from being over tightened.

It is another object of the present invention to provide an attachment device that comprises means for preventing the device from rotating when the device is attached to an object.

It is yet another object of the present invention to provide an attachment device that comprises means for limiting how far an object is inserted into the device.

It is a further object of the present invention to provide an attachment device that comprise at least one barb or tooth for engaging a surface of an object.

It is another objective of the present invention to provide an attachment device that is inexpensive to manufacture.

It is yet another object of the present invention to provide an attachment device that is simple and may be easily installed and removed from an object.

These and other objects of the present invention may be realized by reference to the remaining portions of the specification, claims, and abstract.

2. Brief Description of the Invention

In accordance with the objects of the present invention, an attachment device is provided that is adapted to attach a large variety of objects together. The main body of the attachment device has a U-shaped cross section with an upper portion, a lower portion, and a rear portion. In normal use, a first object is inserted between the upper and lower portions. A hole is provided on both the upper and lower portions for receiving a bolt or screw. The upper and lower portions may also have barbs or teeth for engaging the surfaces of the first object. Two nut holes may be provided on the lower portion for receiving a U-shaped nut. The upward pointing members of the nut project through the holes towards the upper portion of the main body. The members may have barbs or hooks for preventing the nut from disengaging the nut holes. A threaded hole is provided on the nut for receiving the bolt.

The attachment device engages a first object by inserting the first object between the upper and lower portions of the device. The bolt is then tightened until the upper and lower portions grasp the first object. A second object may be attached to the attachment device by inserting the bolt through the second object before it is inserted into the main body of the attachment device or the nut. A separate bracket or attachment member may also be used to attach the second object to the attachment device.

The members of the nut provide a surface for abutting the upper portion of the main body. This prevents the attachment device from being over tightened and crushed. The members also provided a surface for abutting the first object when it is inserted between the upper and lower portions. This prevents the first object from being inserted too far into the attachment device and it holds the rear portion of the attachment device parallel to the edge of the first object.

The above description sets forth, rather broadly, the more important features of the present invention so that the detailed description that follows may be better understood and the contributions of the present invention to the art may be better appreciated. There are additional features of the invention that will be described below which will form the subject matter of claims appended hereto. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

REFERENCE NUMERALS

Figures 1, 2, 3, 4, 5:
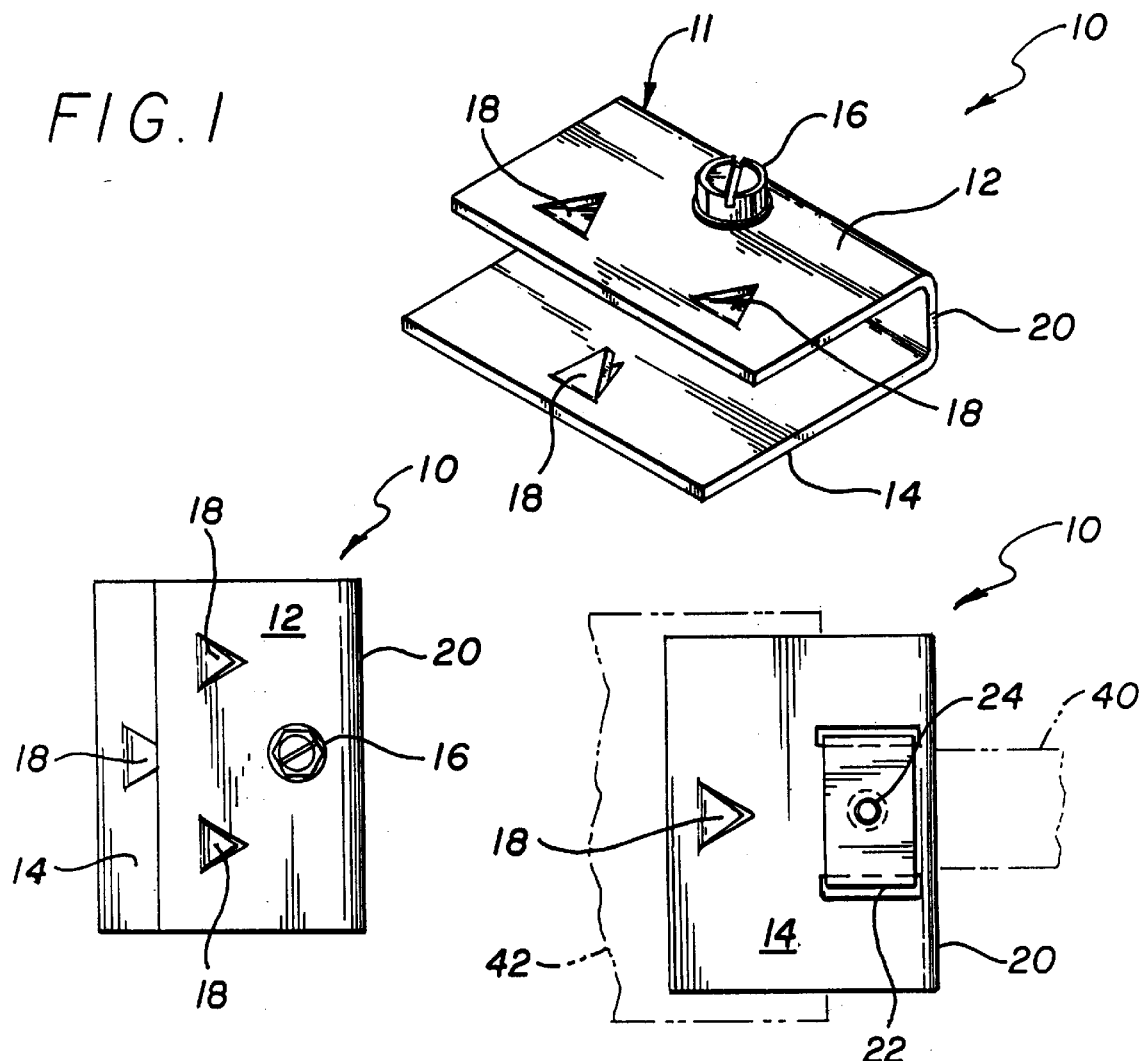
FIG. 1 is substantially a perspective view of one embodiment of the attachment device of the present invention.
FIG. 2 is substantially a top view of one embodiment of the attachment device of the present invention.
FIG. 3 is substantially a side view of one embodiment of the attachment device of the present invention attaching two objects together.
FIG. 4 is substantially a bottom view of one embodiment of the attachment device of the present invention attaching two objects together.
FIG. 5 is substantially a front view of one embodiment of the attachment device of the present invention.

10 attachment device
11 clamp 12 upper portion
14 lower portion
16 bolt
18 barbs
20 rear portion
22 nut
24 shaft
26 nut members
28 nut barbs
40 second object
42 first object

DESCRIPTION OF THE PREFERRED EMBODIMENT

As seen in FIG. 1 through 5, the attachment device of the present invention, generally indicated by reference number 10, comprises a main body or clamp 11 that has a substantially U-shaped side cross section. Clamp 11 has an upper portion 12, a lower portion 14, and a rear portion 20. Upper and lower portions 12 and 14 may be different lengths to make it easier for an object to be inserted between the portions. One or more barbs 18 may be provided on upper and lower portions 12 and 14 for engaging the surface of objects that are inserted between the portions. In the preferred embodiment, two barbs are provided on upper portion 12 and one barb is provided on lower portion 14. This arrangement helps attachment device 10 grasp curved objects, such as vehicle wheels.

A hole is provided in both upper and lower portions 12 and 14 for receiving a bolt 16. Lower portion 14 has two rectangular nut holes for receiving upward pointing prongs or members 26 of U-shaped nut 22. Members 26 may have barbs 28 for preventing nut 22 from disengaging lower portion 14. It is recognized that the nut of the present invention may be different shapes and still achieve the objects of the present invention. For example, the nut may have a center section that is inserted into a single nut hole in lower portion 14 instead of two side prongs.

As seen in FIGS. 3 and 4, in normal use a first object 42 is inserted between upper and lower portions 12 and 14. The object is inserted up to the point where it abuts members 26 of nut 22. Members 26, inserted through holes in lower portion 14, hold attachment device 10 so that rear portion 20 is substantially parallel to the edge of first object 42. This prevents attachment device 10 from rotating when in use, which could weaken its grip.

A second object 40 may be attached to attachment device 10 by inserting bolt 16 through the second object. Alternatively, a mounting bracket could be used to attach the second object to bolt 16 or other means may be provided on clamp 11 or nut 22 for attaching the second object. Once bolt 16 is threaded through nut 22, it is tightened until barbs 18 engage the surfaces of first object 42 and the first object is clamped between first and second portions 12 and 14. In the preferred embodiment, members 26 are long enough to abut upper portion 12 when bolt 16 is tightened. This prevents over tightening and damage to attachment device 10. Members 26 also provide vibration and shock load dampening. As bolt 16 is tightened, members 26 abut upper portion 12 and may spread slightly outward. This flexing provides a dampening effect that is useful if the attachment device is subject to stress cycles.

Clamp 11 may be formed of any suitable material such as metal or plastic. In the preferred embodiment, clamp 11 is formed from corrosion resistant steel by stamping or pressing. This provides an efficient and inexpensive means for manufacturing the invention. The nut of the present invention may also me made from a variety of materials, such as metal or plastic, however, it is preferably made from nylon. Nylon provides some degree of flexibility that is desirable in dampening vibration and absorbing shock loads.

SUMMARY

It may now be seen that the present invention provides a novel means for attaching one object to another object. The attachment device of the present invention may be attached to a large variety of objects and structures. Means are provided for preventing over tightening and preventing the attachment device from rotating when it is attached to an object. The attachment device is inexpensive to manufacture, light, and durable.

Although the description above contains many specifications, these should not be construed as limiting the scope of he invention but as merely providing illustrations of some of presently preferred embodiments of this invention. For example, elements of the invention have been described in reference to their relative positions in the drawings. Although the relative positions may be changed, the essential functions of the elements remain the same. Thus, the scope of the invention should be determined by the appended claims and their legal equivalents rather than by the examples given.

What is claimed is:

1. An attachment device for attaching a first object to a second object, the first object having an upper and lower surface and an edge, the attachment device comprising:
   (A) a bolt for providing a compressive force;
   (B) a nut for engaging said bolt, said nut having an upper member for abutting the edge of the first object; and
   (C) a body for gripping the first object, said body having a substantially U-shaped cross-section, said body comprising:
      (a) an upper portion for abutting the upper surface, said upper portion having a hole for receiving said bolt; and
      (b) a lower portion for abutting the lower surface, at least one nut hole for receiving said upper member of said nut, wherein said upper member of said nut extends through said nut hole and abuts the edge of the first object when the first object is between said upper and lower portions.

2. The device of claim 1 wherein said nut comprises a substantially U-shaped cross-section and said upper member comprises first and second members, said lower portion of said body comprises first and second nut holes for receiving said first and second members.

3. The device of claim 2 wherein said first and second members comprise barbs for holding said first and second members in said first and second nut holes.

4. The device of claim 1 wherein one of said upper and lower portions is longer than said other portion.

5. The device of claim 1 further comprising at least one barb on said body for engaging a surface of the first object.

6. An attachment device for attaching an article to an object, the object having upper and lower surfaces, the attachment device comprising:
   (A) a bolt for providing a clamping force;
   (B) a nut for receiving said bolt, said nut having an upper member; and
   (C) a substantially U-shaped clamp for engaging the object, said clamp comprising:
      (a) an upper portion for abutting the upper surface of the object, said upper portion having a hole for receiving said bolt; and (b) a lower portion for abutting the lower surface of the object, said lower portion having a nut hole for receiving said upper member of said nut, wherein said upper member of said nut extends through said nut hole and provides a surface for abutting said upper portion.

7. The device of claim 6 wherein said nut is substantially U-shaped with first and second members and said lower portion of said clamp comprises a first and second nut hole for receiving said first and second members.

8. The device of claim 6 wherein said nut comprises a flexible material, whereby said nut provides a spring force for absorbing vibration and preventing said bolt from loosening.

9. The device of claim 6 further comprising at least one barb on said upper or lower surface for engaging a surface of said object.

10. An attachment device for attaching a first object to a second object, the attachment device comprising:

(A) a bolt;
(B) a nut, said nut having an upper member;
(C) a clamp, said clamp having a substantially U-shaped cross-section, said clamp comprising:
  (a) an upper portion, said upper portion having a hole, said hole being adapted to receive said bolt;
  (b) a lower portion, said lower portion having a hole, said hole being adapted to receive said upper member of said nut.

11. The attachment device of claim 10 further comprising at least one barb on said clamp.

12. The attachment device of claim 10 wherein said nut is substantially U-shaped.

13. The attachment device of claim 10 wherein said upper portion and said lower portion are different lengths.

14. The attachment device of claim 10 wherein said nut comprises flexible material.

* * * * *